United States Patent [19]

Bettonica

[11] 4,043,730

[45] Aug. 23, 1977

[54] HYDRAULIC PRESS FOR THE PRODUCTION OF TILES, DISHES, CUPS OF CERAMIC MATERIAL AND THE LIKE

[76] Inventor: Luigi Bettonica, Via Clusone, 3 Milan, Italy

[21] Appl. No.: 681,026

[22] Filed: Apr. 28, 1976

[30] Foreign Application Priority Data

May 13, 1975 Italy .................................. 23241/75

[51] Int. Cl.[2] .......................... B29B 5/02; B29B 11/02

[52] U.S. Cl. .................................... 425/352; 425/415; 425/416; 425/423; 425/DIG. 19

[58] Field of Search ............... 425/406, 411, 412, 415, 425/416, 423, 450.1, 451, 451.2, 451.9, DIG. 19, 78, 352, 355, DIG. 223

[56] References Cited

U.S. PATENT DOCUMENTS

| | | | |
|---|---|---|---|
| 1,863,117 | 6/1932 | Hottel | 425/416 |
| 2,028,021 | 1/1936 | Shippy | 425/415 |
| 2,197,849 | 4/1940 | Burroughs | 425/406 |
| 2,411,043 | 11/1946 | Klassen | 425/DIG. 19 |
| 2,556,951 | 6/1951 | Weidner | 425/78 |
| 2,825,092 | 3/1958 | Hatch et al. | 425/78 |
| 2,855,628 | 10/1958 | Lassman | 425/78 X |
| 2,869,173 | 1/1959 | Von Hardesveldt et al. | 425/DIG. 19 |
| 3,078,540 | 2/1963 | Bush | 425/352 X |
| 3,152,364 | 10/1964 | Alan | 425/DIG. 19 |
| 3,222,748 | 12/1965 | Lamb | 425/415 X |
| 3,284,,858 | 11/1966 | Taccone | 425/DIG. 19 |
| 3,599,289 | 8/1971 | Girola | 425/451.2 X |
| 3,613,166 | 10/1971 | Wallace et al. | 425/416 X |
| 3,650,411 | 3/1972 | Aeis et al. | 425/423 X |
| 3,687,590 | 8/1972 | Cyriox | 425/450.1 X |
| 3,833,333 | 9/1974 | Britten | 425/406 |
| 3,932,085 | 1/1976 | Horbach | 425/406 X |

*Primary Examiner*—J. Howard Flint, Jr.
*Attorney, Agent, or Firm*—Young & Thompson

[57] ABSTRACT

An improved hydraulic press, comprising a base frame with an horizontal bed, to which two stationary heads, termed "fore head" and "rear head", respectively, are firmly secured, said heads being connected with one another by at least two cylindrical, parallel columns, whereon a movable positioning and pre-compression crosshead, operated by hydraulic jacks, is slidingly fitted, whereby to act on a movable punch, located opposite to a stationary die, acting both punch and die, on the recess of a bottom mold; being the pressure on the movable punch, working on the recess of the bottom mold, being exerted through a pad made of an elastically flexible material, interposed between said crosshead and said fore head, it being possible to have said pad filled with a pressurized liquid.

4 Claims, 3 Drawing Figures

HYDRAULIC PRESS FOR THE PRODUCTION OF TILES, DISHES, CUPS OF CERAMIC MATERIAL AND THE LIKE

This invention concerns hydraulic presses, particularly designed for the production of ceramic tiles, dishes, cups and the like. In more detail, the invention concerns a number of improvements made in the hydraulic press disclosed and shown in my U.S. Pat. No. 3,923,440, in respect of which the press according to this invention shows remarkable structural and constructional simplifications, a reduction in the overall size, as well as appreciable adaptions and improvements, aiming above all at an acceleration of production.

Such improvements mainly concern the use of a special, wholly sealed "pad" or "bag", made of an elastically fexible material, and which is filled with a high pressure liquid (usually oil), whereby to exert on the material to be molded, a pressure sufficient to take the required consistency and shape, as well as the recourse to articulated joints to allow for a quick replacement of pressure assembly — comprising at least one movable punch, at least one stationary die and a bottom mold formed with at least one recess — for another, separately combined assembly.

Such improvement will be better appreciated from a consideration of the following description of improved hydraulic press according to the invention, made with reference to accompanying drawings, wherein FIG. 1 is a part sectional view of an improved hydraulic press according to the invention.

Figure 1:
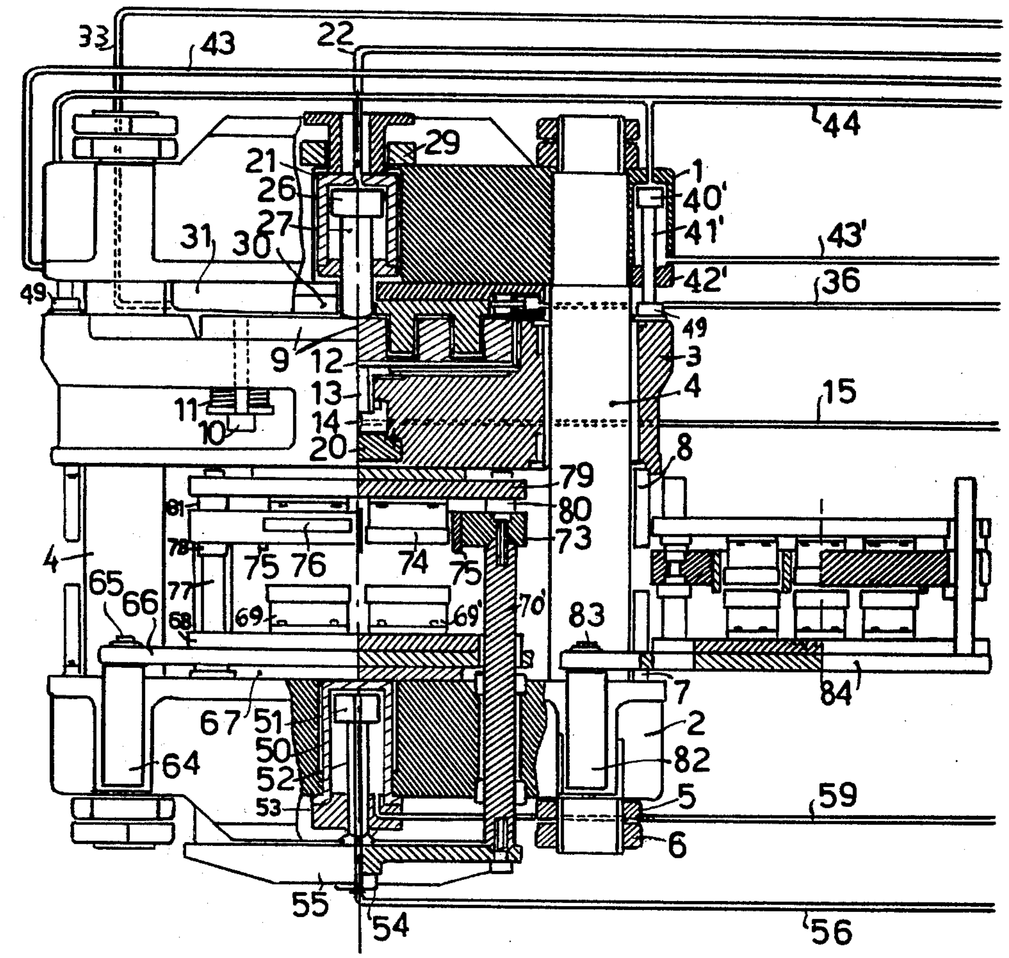

The improved hydraulic press according to the invention is particularly designed for the production of ceramic tiles, dishes, cups and the like, and comprises, fitted on a based frame having a preferably horizontal bed, a stationary fore head 1, and a stationary rear head 2, with their front sides parallel with each other. Secured to said heads by screw means, locked by two check nuts 5 and 6, are two cylindrical, parallel columns 4, whereon a so called positioning and precompression movable crosshead 3 is slidingly fitted and guided.

A so called pressing plate 9 is connected with said crosshead 3 by two tierods 10, with the interposition of spring (or equivalent) means 11. The side of plate 9, directed toward the crosshead 3, is slightly spaced therefrom, and a bag 12, made of an elastically fexible material is inserted in the resulting intervening space, there being the possibility to fill said bag with a pressurized liquid, through the flanged connector 13, leading to cavity 14 and with which the pipe 15 is connected. A bottom 20 is provided for tightly sealing said cavity 14.

A single acting hydraulic jack, by which the movable crosshead 3 is driven, is fitted into a suitable seat with which the center of head 1 is formed, said jack consisting of a cylinder 21, within which a piston can be axially moved. The pressure of said jack is applied, by a piston rod 27, whose free end extends through elongated holes with which the plates 30 and 31 are formed, to pressing indented plate 9, by which one of major sides of elastic bag 12 is acted upon. A pressure liquid can be fed to jack cylinder 21, through the pipe 22.

Formed close to two ends of fore head 1, symmetrically opposite to the seat of above jack, are two further seats, wherein two double acting hydraulic jacks are fitted, such jacks comprising two cylinders 39 and 39', within which the pistons 40 and 40' are axially movable; the free ends of piston rods 41 and 41' are connected by articulated joints 47–48–49 and 47'–48'–49', with the movable crosshead 3, which is slidingly fitted on the columns 4. A pressure liquid can be simultaneously fed to cylinders 39 and 39', through the pipes 44, 44' or the pipes 43 and 43'.

Two opposite side walls of movable indented plate 30, which is formed with rectangularly shaped stub teeth, are acted upon by the piston rods of two single-acting hydraulic jacks, comprising the pistons 32 and 35, whereby to have the same plate 30 is moved crosswise, when the teeth thereof are to be brought out of mesh from those of pressing plate 9. A pressure liquid can be fed to said jacks through the pipes 33 and 36.

A double acting hydraulic jack is fitted into a seat, with which the center of rear head 2 is formed, said head being connected with the fore head 1 by the columns 4. The latter jack consists of a cylinder 50, closed by a bottom 53, and within which a piston 51 is slidingly fitted. The rod 52 of said cylinder is connected by screw means, locked by a nut 54, with the movable crosshead 55, which is in turn connected, by at least two cylindrical rods 70–70' (slidingly guided by the bushes 71–72 and 71'–72', secured to head 2) with the die 73.

Connected by screw means with the head 2, is a so called safety plate 67, which is in turn connected, also by screw means, a further plate 66 and a base plate 68 for the stationary mold 69.

Fastened by screw means to plates 66–68 are the cylindrical uprights 77 and 77', whereon both the die 73 and the plate 79 are slidingly fitted by means of the bushes 78–78' and 80–80', respectively, the latter plate 79 bearing the pressure punch 74, which is secured by screw means thereto.

Same plate 79 is fastened, again by screw means, to movable crosshead 3, through a so called safety plate 81.

Figure 3:
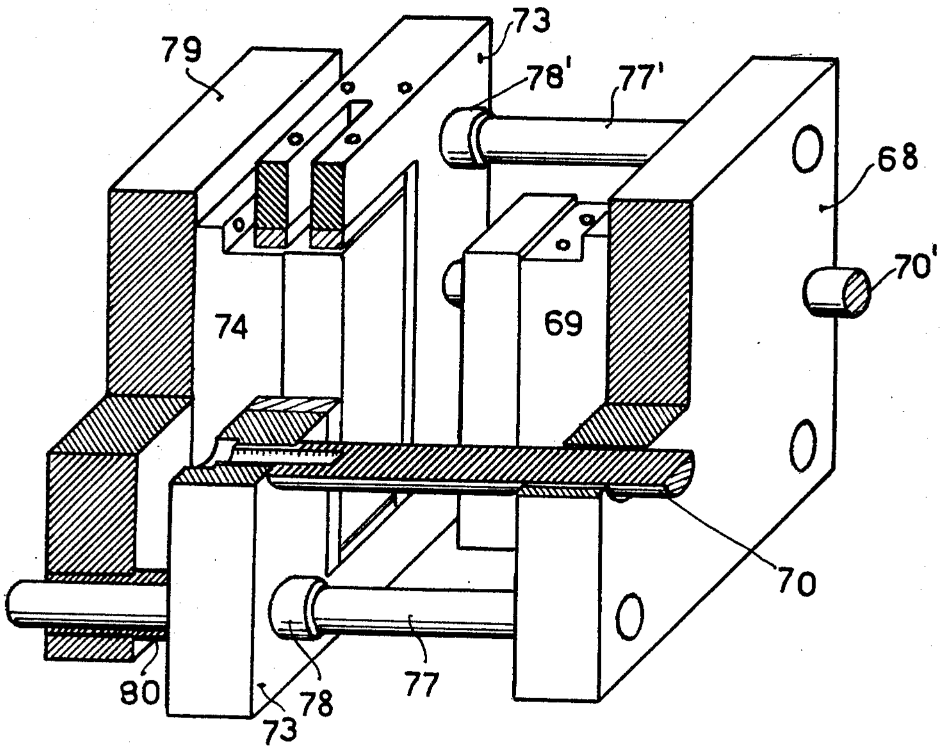
FIG. 3 is a part sectional axonometric view of the pressure assembly only.

The pressure assembly, comprising the die 73 (controlled by the uprights 70–70'), the plate 79 by which the pressure punch 74 is supported, and the bed 68 whereon the stationary mold 69 is secured, is shown in an enlarged part sectional view, in FIG. 3.

In the preferred embodiment form of the improved hydraulic press according to this invention, the bed plate 68, to which the stationary mold 69 is connected, and carrying the uprights 77–77' whereon both the die 73 and the plate 79 by which the presser punch 74 is supported, is articulated in a plane, and connected with a journal 65, which is revolvingly fitted in a stationary sheath 64, whereby the whole pressure assembly, comprising the die 73, the pressure punch carrying plate 79 and the stationary mold, can be removed from its operating position and swung to one side of machine, to allow e.g. for the replacement thereof.

A second bed plate 84, fitted with a second pressure assembly, is preferably articulated in a plane, and connected with a journal 83, which is revolvingly seated in a stationary sheath 82, secured to the side of machine opposite to that wherein the sheath 64 is secured. This allows, e.g., to make ready a second pressure assembly, while the work is on with the first pressure assembly as previously described.

Stop means, as e.g. those denoted by 7 and 8, are provided to protect the pressure assemblies in the course of automatic operation of the press.

The operation of the hydraulic press as previouslyy described, may be concisely described as follows.

Figure 2:
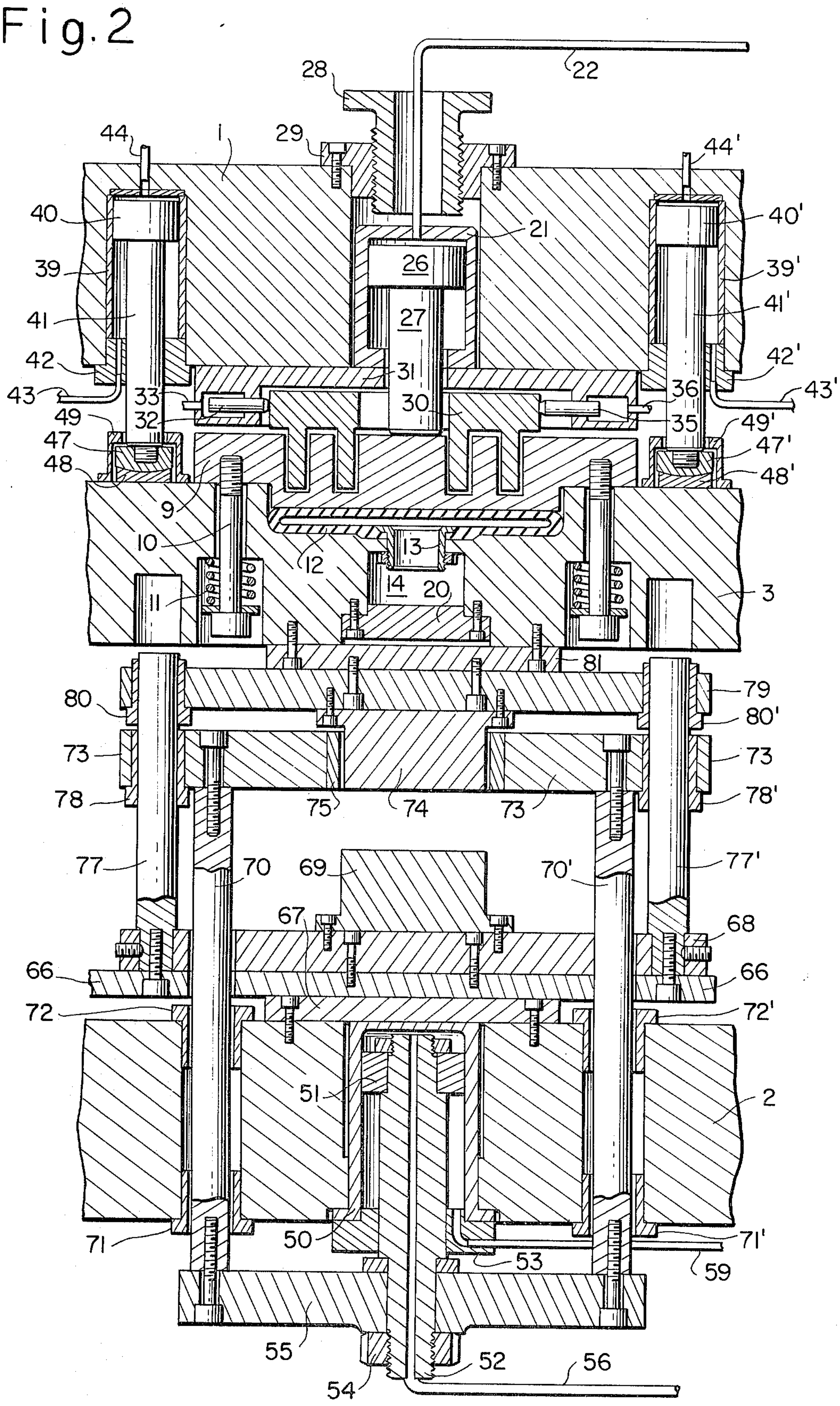
FIG. 2 is an enlarged part sectional view of the middle portion only of the press as shown in FIG. 1, however in the embodiment form having a single bottom mold.

Assuming that the different movable components of the machine are in their initial rest position, as shown in FIG. 2, wherein the pressure assembly comprises one mold and one movable punch only, the die 73 is to be firstly moved toward the rear head 2, thus allowing the stationary mold 69 to partly enter into the cavity thereof, and to thereby close the opening directed toward mold 69. This is effected by feeding pressure liquid through the pipe 56, whereby to have the crosshead 55 driven away from the head 2, said crosshead being driven by the double acting jack 50–51–52, and connected with the die through the uprights 70–70'.

Then the movable punch 74 is to be operated, thereby to bring it partly into the cavity of the die which, by the previously described operation, was moved away therefrom. This is effected by feeding a pressure liquid to single acting hydraulic jack 21–26–27 through the pipe 22.

By the above stated operation, the two opposite openings of die 73 are closed, and at the same time, the toothed plate 30, which is retained by the head 1, is drawn away from the toothed plate 9, which is retained by the sprung tierods 10–11 (or other equivalent means).

When the teeth of plate 30 are wholly disengaged from those of plate 9, a pressure fluid is fed to hydraulic jack 32 through the pipe 33, whereby the plate 30 is driven to the right until its teeth are above the stub teeth of plate 9, thus keeping the two plates steadily spaced.

Then the cavity of the die can be filled, through the opening 76 (on top of which is a hopper, not shown), with the mixture to be pressed.

The pre-compression of the mixture is performed by the simultaneous operation of both hydraulic jacks 39–40–41–42 and 39'–40'–41'–42', fitted in the crosshead 3, and to which a pressure fluid is fed through the pipes 44 and 44'.

The final compression of the mixture is performed by feeding to bag 12 a pressure liquid through the pipe 15, the cavity 14 (closed by the bottom 20) and the flanged connector 13. As already stated, said bag 12 is made of an elastically flexible material, such as e.g. a rubber that cannot be attached by the hydraulic fluid utilized.

The main advantage that can be derived from the use of elastic bag 12 consists in that the hydraulic jacks, fitted to fore head 1, need not be tightly sealed, nor be able to exert high pressure.

Obviously, for the ejection of the pressed piece, with the consequent opening of the die and the bringing of the machine back to starting conditions, the same operations are to be performed, however in a reversed sequence.

As can be readily appreciated, when the hopper is not fitted with means to cut-off the feed of mixture, then the order of succession of different operations may also be partly modified in respect of what has been previously stated.

The feeding of pressure liquid through the different pipes, as well as the regulation and cutting-off thereof may be effected manually, or preferably by having recourse to electromagnetic valves, controlled by information coming from a suitable data processing machine.

What I claim is:

1. A press for the production of ceramic tiles and dishes, comprising in combination a pair of stationary top and bottom heads (1 and 2), columns (4) interconnecting said heads, a crosshead (3) mounted for vertical movement on said columns between said heads, a pressing plate (9), means (10,11) connecting said pressing plate to said crosshead (3) for limited vertical movement of said pressing plate relative to said crosshead, a bag of elastically flexible material between said pressing plate and said crosshead, means for supplying fluid under pressure to the interior of said bag, a die (73) having at least one die recess opening vertically therethrough, a movable punch (74) carried by said crosshead, a stationary mold (69) connected to one of said stationary heads, said punch (74) and mold (69) being receivable in opposite ends of said die recess, means (50,51) to move said die vertically relative to said stationary mold, hydraulic jack means (40,41) for moving said crosshead and punch vertically relative to said die independently from the pressure which is exerted by said elastically flexible bag, and means (30) for selectively restraining movement of said crosshead away from said die, whereby said supplying of fluid under pressure to said bag applies high pressure to said punch in the direction of said stationary mold.

2. A press as claimed in claim 1, said pressing plate (9) having teeth thereon that interfit with teeth on a further plate (30) carried by one of said stationary heads and comprising said restraining means, and means (32,35) for moving said further plate horizontally relative to said pressing plate so that the teeth of said pressing plate and further plate are out of registry and interfere with each other when said crosshead and movable punch are displaced toward said stationary mold thereby to maintain the spacing between said crosshead and said stationary head on which said further plate is mounted.

3. A press as claimed in claim 1, and means mounting said die and punch and stationary mold for horizontal swinging movement as a unit thereby to allow for the insertion or removal of a similar said unit between said heads of the press.

4. A press as claimed in claim 1, in which said means (10,11) connecting said crosshead (3) and said plate (9) for limited relative vertical movement comprises tie rods (10) and coil compression spring means (11) encircling said tie rods, said tie rods being secured to one of said crosshead and plate and said spring means bearing against the other of said crosshead and plate.

* * * * *